(12) United States Patent
Tailor et al.

(10) Patent No.: US 8,249,643 B1
(45) Date of Patent: Aug. 21, 2012

(54) DUAL-MODE CAPACITY REALLOCATION

(75) Inventors: PinalKumari K. Tailor, Ashburn, VA (US); Hetal J. Mistry, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 538 days.

(21) Appl. No.: 12/423,172

(22) Filed: Apr. 14, 2009

(51) Int. Cl.
*H04B 7/00* (2006.01)
*H04B 15/00* (2006.01)

(52) U.S. Cl. ........................................ 455/525; 455/524

(58) Field of Classification Search .................. 455/525, 455/500, 512, 524, 73
See application file for complete search history.

(56) References Cited

U.S. PATENT DOCUMENTS

| | | | |
|---|---|---|---|
| 6,418,319 B1 * | 7/2002 | Dent ........................... | 455/456.3 |
| 7,783,292 B2 * | 8/2010 | Wei ............................... | 455/450 |
| 7,917,149 B2 * | 3/2011 | Chen et al. .................... | 455/450 |
| 2002/0160783 A1 | 10/2002 | Holtzman et al. | |
| 2004/0057412 A1 * | 3/2004 | Curcio et al. ................. | 370/341 |
| 2005/0190782 A1 * | 9/2005 | Buckley et al. ............... | 370/437 |
| 2006/0133323 A1 * | 6/2006 | Obuchi et al. ................. | 370/335 |
| 2006/0256749 A1 * | 11/2006 | Rexhepi et al. ............... | 370/329 |
| 2008/0004024 A1 * | 1/2008 | Puri et al. ....................... | 455/436 |
| 2008/0049675 A1 | 2/2008 | Burgan et al. | |
| 2008/0268839 A1 * | 10/2008 | Ayers et al. ................. | 455/435.1 |
| 2008/0293403 A1 | 11/2008 | Quon et al. | |
| 2009/0088170 A1 * | 4/2009 | Aaron ........................... | 455/445 |
| 2010/0216465 A1 * | 8/2010 | Mubarek et al. ........... | 455/435.1 |

* cited by examiner

*Primary Examiner* — Peguy Jean Pierre

(57) ABSTRACT

Using a first station, a wireless device is communicated with via a first type of wireless service. Resources associated with the wireless device are determined they should be re-allocated. A command and an indicator that result in the wireless device scanning for a second type of wireless service are sent to the wireless device.

18 Claims, 6 Drawing Sheets

```
┌─────────────────────────────────┐
│ RECEIVE, BY A WIRELESS DEVICE,  │
│ A COMMAND AND AN INDICATOR,     │
│ THE COMMAND CAUSING THE         │
│ WIRELESS DEVICE TO              │
│ DEREGISTER FROM A FIRST         │
│ STATION USING A FIRST TYPE OF   │
│ WIRELESS SERVICE AND THE        │
│ INDICATOR CAUSING THE           │
│ WIRELESS DEVICE TO AVOID RE-    │
│ REGISTERING USING THE FIRST     │
│ TYPE OF WIRELESS SERVICE        │
│              402                │
└────────────────┬────────────────┘
                 │
┌────────────────┴────────────────┐
│ SCANNING FOR A SECOND TYPE      │
│ OF WIRELESS SERVICE             │
│              404                │
└────────────────┬────────────────┘
                 │
┌────────────────┴────────────────┐
│ COMMUNICATING USING THE         │
│ SECOND TYPE OF WIRELESS         │
│ SERVICE                         │
│              406                │
└─────────────────────────────────┘
```

RECEIVE, BY A WIRELESS DEVICE, A COMMAND AND AN INDICATOR, THE COMMAND CAUSING THE WIRELESS DEVICE TO DEREGISTER FROM A FIRST STATION USING A FIRST TYPE OF WIRELESS SERVICE AND THE INDICATOR CAUSING THE WIRELESS DEVICE TO AVOID RE-REGISTERING USING THE FIRST TYPE OF WIRELESS SERVICE
402

SCANNING FOR A SECOND TYPE OF WIRELESS SERVICE
404

COMMUNICATING USING THE SECOND TYPE OF WIRELESS SERVICE
406

FIGURE 4

DUAL-MODE CAPACITY REALLOCATION

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

OVERVIEW

A method of operating a communication system is disclosed. Using a first station, a wireless device is communicated with via a first type of wireless service. Resources associated with the wireless device are determined they should be reallocated. A command and an indicator that result in the wireless device scanning for a second type of wireless service are sent to the wireless device.

A communication system is disclosed. A first station is configured to communicate with a wireless device using a first type of wireless service. In response to a determination that resources associated with the wireless device should be reallocated, the first station sends a command and an indicator to the wireless device that result in the wireless device scanning for a second type of wireless service. A second station, which is selected by the wireless device during scanning, is configured to communicate with the wireless device using the second type of wireless service.

A method of operating a wireless device is disclosed. From a first station using a first type of wireless service, a command and an indicator are received. The command causing the wireless device to deregister from the first type of wireless service being provided by the first station. The indicator causing the wireless device to avoid reregistering with the first station using the first type of wireless service. A second type of wireless service is scanned. The second type of wireless service is used to communicate.

BRIEF DESCRIPTION OF THE DRAWINGS

FIG. 4 is a flowchart illustrating a method of operating a wireless device.

DETAILED DESCRIPTION

In an embodiment, a dual-mode wireless devices is operating in a region that has two different types of wireless service available. For example, a wireless device may be operating in a region that has both WiMAX and EV-DO. When the network, or air-interface, associated with one of the two types of wireless service becomes heavily loaded, the network causes dual-mode wireless devices to move off the heavily loaded type of service. In other words, if one of the WiMAX or EV-DO networks, or air-interfaces, are heavily loaded, the network will cause dual-mode wireless devices to move from WiMAX to EV-DO, and visa versa.

In particular, the network will send a deregister command to a dual-mode wireless device to force it off the heavily loaded type of service. Furthermore, the network will send an indicator that causes dual-mode wireless device to refrain from trying to reregister on the heavily loaded type of service. When the dual-mode wireless device scans for a new connection, it will most likely choose the lighter loaded type of service. Thus, dual-mode wireless devices are moved off the heavily loaded type of service an on to the lighter loaded type of service. This frees up resources associated with the heavily loaded type of service.

Figure 1:
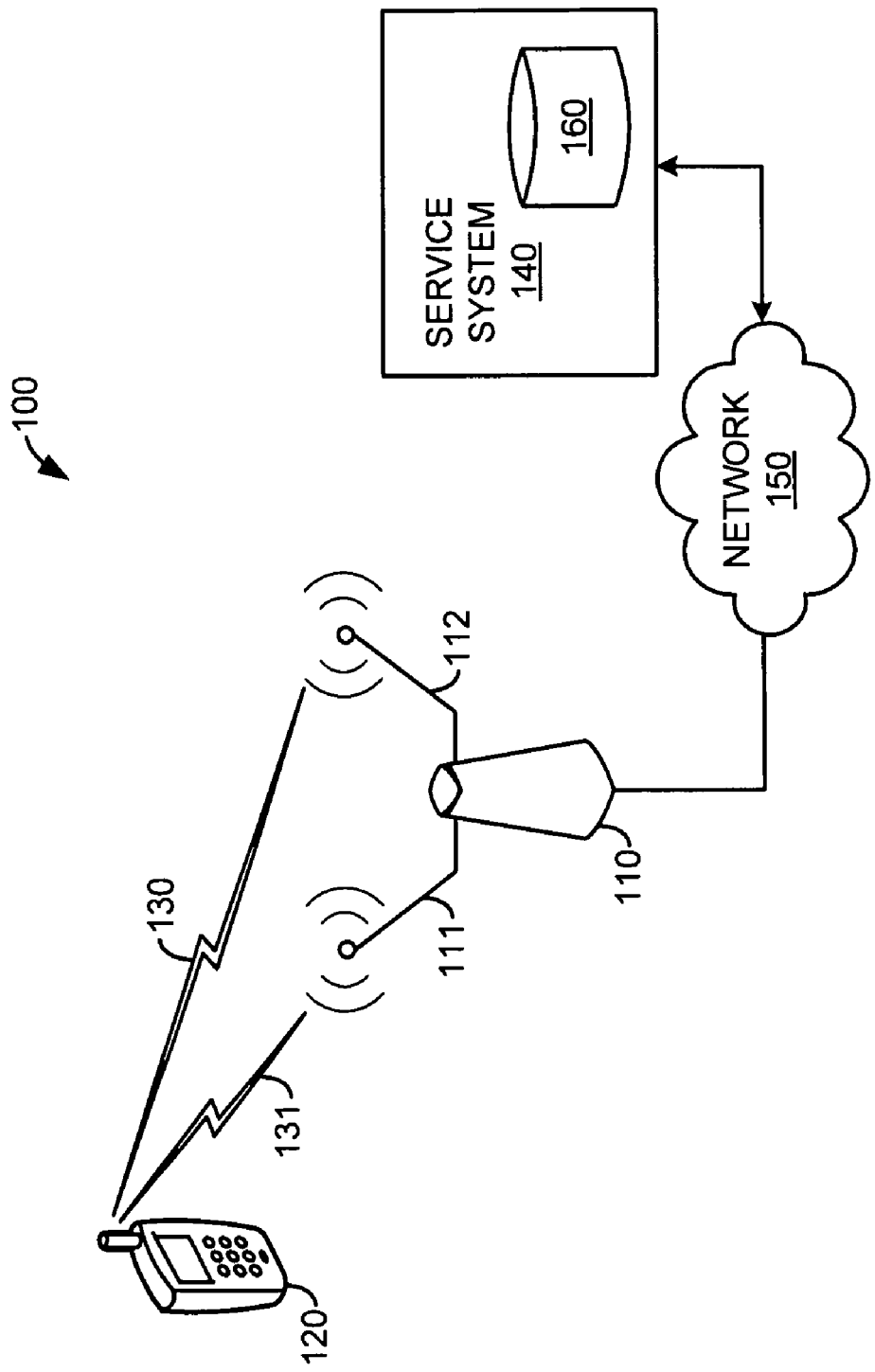
FIG. 1 is a block diagram illustrating a communication system.

FIG. 1 is a block diagram illustrating a communication system. In FIG. 1, communication system 100 comprises base station 110, wireless device 120, service system 140, and network 150. Base station 110 includes co-located wireless stations 111 and 112. In an embodiment, wireless stations 111 and 112 are not co-located, but have overlapping service areas. Service system 140 may include database 160. Base station 110 is operatively coupled to network 150. Network 150 is operatively coupled to service system 140. Wireless device 120 may be operatively coupled to base station 110 via wireless link 135 and wireless station 111. Wireless device 120 may be operatively coupled to base station 110 via wireless link 136 and wireless station 112.

Wireless station 111 may provide a first type of wireless service to wireless device 120 via wireless link 135. For example, wireless station 111 may provide a wireless service based on orthogonal frequency division multiplexing (OFDM) or orthogonal frequency division multiple access (OFDMA). In another example, wireless station 111 may provide a high bandwidth wireless service based on modern standards. Examples of these high bandwidth wireless services include, but are not limited to, WiMAX and LTE. Other types of high bandwidth wireless services may be provided by wireless station 111.

Wireless station 112 may provide a second type of wireless service to wireless device 120 via wireless link 136. For example, wireless station 112 may provide wireless service that is based on code division multiple access (CDMA) or time division multiple access (TDMA). In another example, wireless station 112 may provide a wireless service that is based on cellular phone technology standards. Examples of wireless services based on cellular technologies include, but are not limited to, EV-DO, Global System for Mobile communications (GSM), CDMA, and TDMA. Other types of cellular technology type wireless services may be provided by wireless station 111.

Wireless device 120 may be any device, system, combination of devices, or other such communication platform capable of communicating with base station 110 via wireless stations 111 and 112, and wireless links 135 and 136, respectively. As discussed above, wireless links 135 and 136 provide communication between wireless device 120 and wireless stations 111 and 112 using two different wireless services. Wireless device 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via wireless links. Other types of communication platforms are possible.

Base station 110 may be any wireless system that provides two different types of wireless service air interfaces to wireless device 120, and communication connectivity to network 150. Wireless station 111 and wireless station 112 may be any wireless system that provides a single air interface to wireless device 120, and communication connectivity to network 150. Examples of base stations and wireless stations that may be utilized include, base transceiver stations (BTSs), radio base stations (RBSs), Node B, enhanced Node B (eNBs) and others. Base stations and wireless stations may include a number of elements known to those skilled in the art comprising a transceiver, power amplifier, combiner, duplexer, antenna and control function.

Network 150 may comprise a computer, a network, or a collection of computers and networks that couple, link, or otherwise operatively provide wireless device 120 with communication service. It should be understood that network 150 may comprise secondary data networks. For example, network 150 may include a backhaul network, a local network, a long distance network, a packet network, or any combination thereof, as well as other types of networks. Network 150 may be, or include, an access service network (ASN), an access service network gateway (ASN-GW), wireless local access network access gateway (WAG), packet data gateway (PDG), mobile switching center (MSC) and packet data serving node (PDSN).

Network 150 is operatively coupled to service system 140. Since service system 140 includes database 160, and network 150 is operatively coupled to service system 140, network 150 is operatively coupled to database 160. Likewise, since base station 110 is operatively coupled to network 150, base station 110 (and thus wireless stations 111 and 112) may be operatively coupled to database 160.

Service system 140 may be any system or collection of systems, such as database 160, capable of storing and retrieving information about at least one of: (a) services provided by network 150; (b) services provided by or to networks, users, or a wireless device 120 connected to network 150; (c) configuration information for network 150; or, (d) configuration or capabilities associated with a wireless device 120. In an example, service system 140 is part of a connectivity service network (CSN) and performs authentication, authorization, and accounting operations. In another example, service system 140 is a device capabilities server (DCS) and provides information about wireless device 120. Service system 140 may manage user or device profiles for authentication (e.g., verifying device identifier, user name, or password).

Service system 140 may provide configuration information to network 150 or base station 110 that specifies a type of service to deliver, and policies to enforce that may restrict access by, or services provided to, wireless device 120. For example, when wireless device 120 first couples to wireless station 111, wireless device 120 may send a registration message to network 150 asking for permission to use base station 110 and network 150 to communicate to other systems. The registration message may include a device identifier. Network 150 may then forward that registration message, along with a device identifier to service system 140. Service system 140 may then query database 160 with the device identifier to determine if wireless device 120 may use base station 110 and network 150. Service system 140 may then inform base station 110 and network 150 whether wireless device 120 may use network 150.

A device identifier may be one or more of, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 140 may also query database 150 to provide configuration information to base station 110 and network 150 that determines how wireless device 120 may use base station 110 and network 150. For example, service system 140 may inform base station 110 that wireless device 120 is a dual-mode wireless device.

In an embodiment, wireless device 120 may also be associated with a first profile. Other wireless devices (not shown) may be associated with a other profiles. For example, wireless device 120 may be associated with a low quality of service profile. In other words, communication system 100 may associate wireless device 120 with a profile (e.g., "bronze") that is designed to differentiate wireless device 120 from other wireless devices associated with a higher quality of service profile (e.g., "silver" or "gold"). Based on this association, communication system 100 may undertake efforts to improve the quality of service provided to wireless devices associated with higher quality of service profiles at the expense of wireless devices associated with lower quality of service profiles (e.g., wireless device 120). The quality of service profile associated with wireless device 120 may be communicated by service system 140 to network 150 and base station 110.

In an embodiment, some wireless devices may be associated with high-priority applications or traffic flows. For example, these wireless devices may be sending and receiving large uploads and downloads, streaming live traffic, and other minimum bandwidth dependent applications, service flows, or traffic flows. Other wireless devices, such as wireless device 120, may be using applications that are intermittent and comprise small bursts of data or low priority traffic flows. For example, wireless device 120 may be exchanging small FTP sessions, HTTP exchanges, email, or browsing the web. The nature and quality of service to be associated with the applications, service flow, or traffic flows, associated with wireless device 120 may be communicated by service system 140 to network 150 and base station 110.

Traffic flows, applications, or service flows may have one or more service flow classifications. For example, network 150 may direct a traffic flow to wireless device 120 that includes a service traffic flow classification for voice service and a service traffic flow classification for a web browsing service. Likewise, network 150 may direct a traffic flow to wireless device 120 that includes a service traffic flow classification for voice service and a service traffic flow classification for a web browsing service. The service traffic flow classifications for voice service and for web browsing service may have different quality of service (QoS) requirements. In an embodiment, the service flow classifications may include wireless traffic classifications. For example, for WiMAX wireless communication there are wireless traffic quality of service classifications that include: unsolicited grant service (UGS), real time polling service (rtPS), extended real time polling service (ertPS), non-real time polling service (nRTPS), and best effort (BE).

In an embodiment, communication system 100 may determine the resources associated with the first type of wireless service should be re-allocated. For example, network 150, base station 110, or wireless station 111 may determine the resources associated with the first type of wireless service are heavily loaded. Communication system 100 may then take proactive steps to reduce the traffic or resource utilization associated with the first type of wireless service.

Based on a profile associated with wireless device 120, or a priority associated with an application, service flow, or traffic flow associated with wireless device 120, communication system 100 may select wireless device 120 to be moved from using the first type of wireless service to using the second type of wireless service. For example, wireless device 120 may be selected to be moved from a high-bandwidth type of wireless service to a cellular type of wireless service based on a user profile associated with wireless device 120. In particular, wireless device 120 may be selected to be moved because it is associated with a lower quality of service profile or application priority than other wireless devices using the high bandwidth type of wireless service. In an embodiment, wireless device 120 may be selected to be moved because it is associated with a lower service traffic flow classification.

In an embodiment, communication system 100 moves wireless device 120 from the first type of wireless service to the second type of wireless service by sending a command and an indicator. The command causes wireless device 120 to deregister from the first type of wireless service. For example, communication system 100 may send a deregister command to wireless device 120 via wireless station 111 that causes wireless device 120 switch to an idle state.

The indicator causes wireless device 120 to refrain from reconnecting to the first type of wireless service. For example, communication system 100 may inform wireless device 120 that wireless device 120 is being placed into an idle state because of a capacity constraint associated with the first type of wireless service. Once wireless device 120 knows that there is a capacity constraint associated with the first type of wireless service, it may choose to scan for a second type of wireless service that may not be associated with a capacity constraint. Thus, wireless device 120 will, for some period of time, not attempt to scan for, or connect to, the first type of wireless service.

Wireless device 120 may then scan for, and connect to, a second type of wireless service. For example, wireless device 120 may scan for the second type of wireless service. The scanning process may result in wireless device 120 selecting wireless station 112. Wireless device 120 may select wireless station 112 based on a received signal strength. After selecting wireless station 112 to provide the second type of wireless service, wireless device 120 may connect to, and communicate with, wireless station 112.

In an embodiment, wireless device 120 may also request a service level. This service level may be associated with wireless device 120 as a whole, or a particular application, service flow, or traffic flow. For example, wireless device 120 may request a minimum throughput from wireless station 112. If wireless station 112 is able to provide the requested level of throughput, wireless station 112 may send an indication that the requested throughput is available. In another example, wireless device 120 may request, and wireless station 112 may grant, a minimum modulation and coding scheme.

Figure 2:
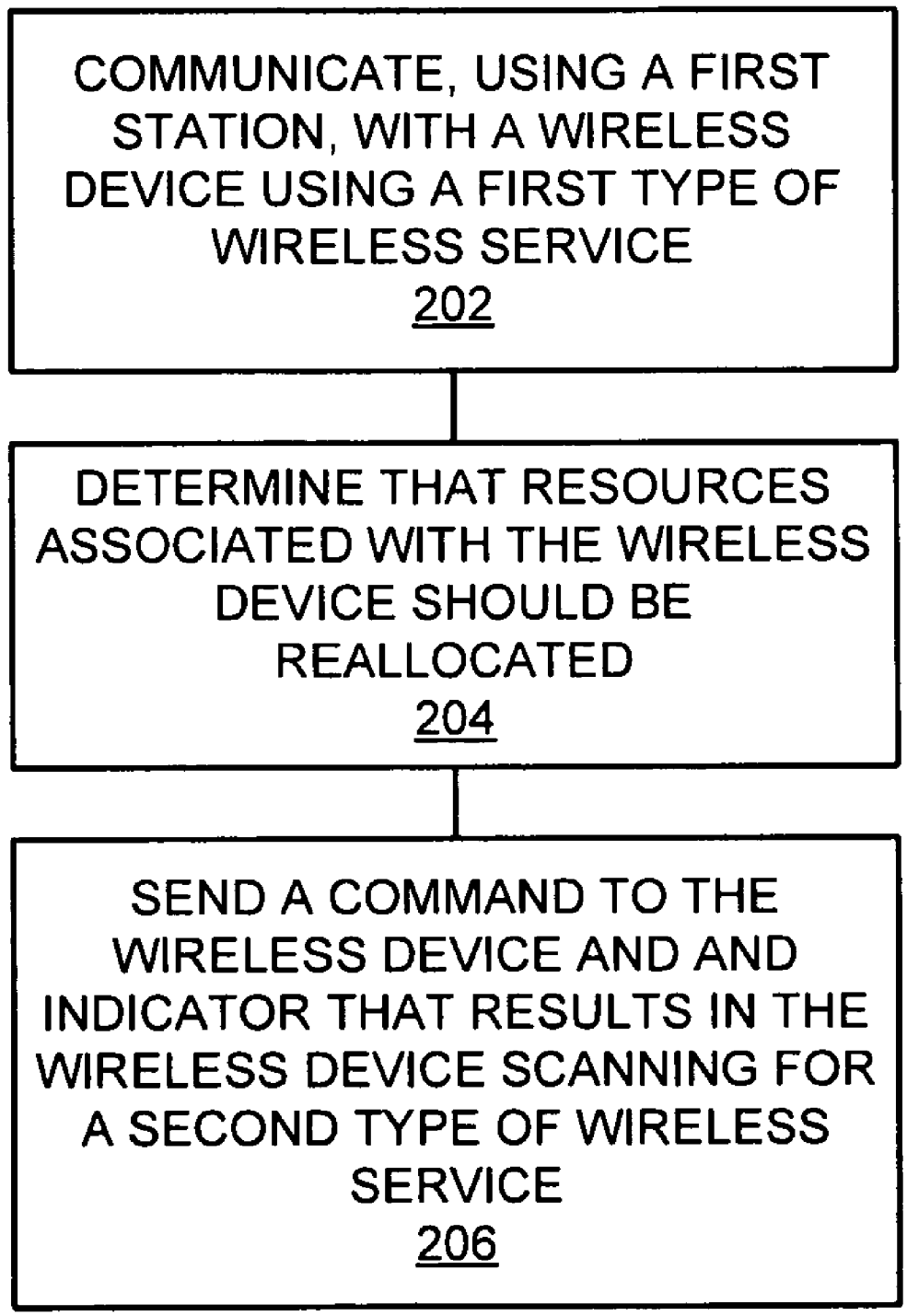
FIG. 2 is a flowchart illustrating a method of operating a communication system.

FIG. 2 is a flow chart illustrating a method of selecting a wireless network. The steps illustrated in FIG. 2 may be performed by one or more elements of communication system 100.

Using a first station, a wireless device is communicated with using a first type of wireless service (202). For example, network 150 may communicate with wireless device 120 via base station 110 and wireless station 111 using a first type of wireless service provided by wireless station 111. Resources associated with the wireless device are determined that they should be reallocated (204). For example, network 150 may determine that network or air-interface resources associated with wireless device 120 should be reallocated from the type of wireless service being provided by wireless station 111 to the type of wireless service being provided by wireless station 112. This determination may be based on a profile associated with wireless device 120. This determination may be based on a quality of service associated with a service flow or traffic flow associated with wireless device 120.

A command and an indicator are sent to the wireless device that results in the wireless device scanning for a second type of wireless service (206). For example, a command may be sent to wireless device 120 that causes wireless device 120 to deregister from wireless station 111. In addition, an indicator may be sent to wireless device 120 specifying that wireless device 120 should not attempt to reregister with the type of wireless service being provided by wireless station 111. Thus, because wireless device 120 knows it should not attempt to reregister with the first type of wireless service, wireless device 120 may scan for a second type of wireless service. For example, wireless device 120 may scan for the type of wireless service being provided by wireless station 112.

Figure 3:
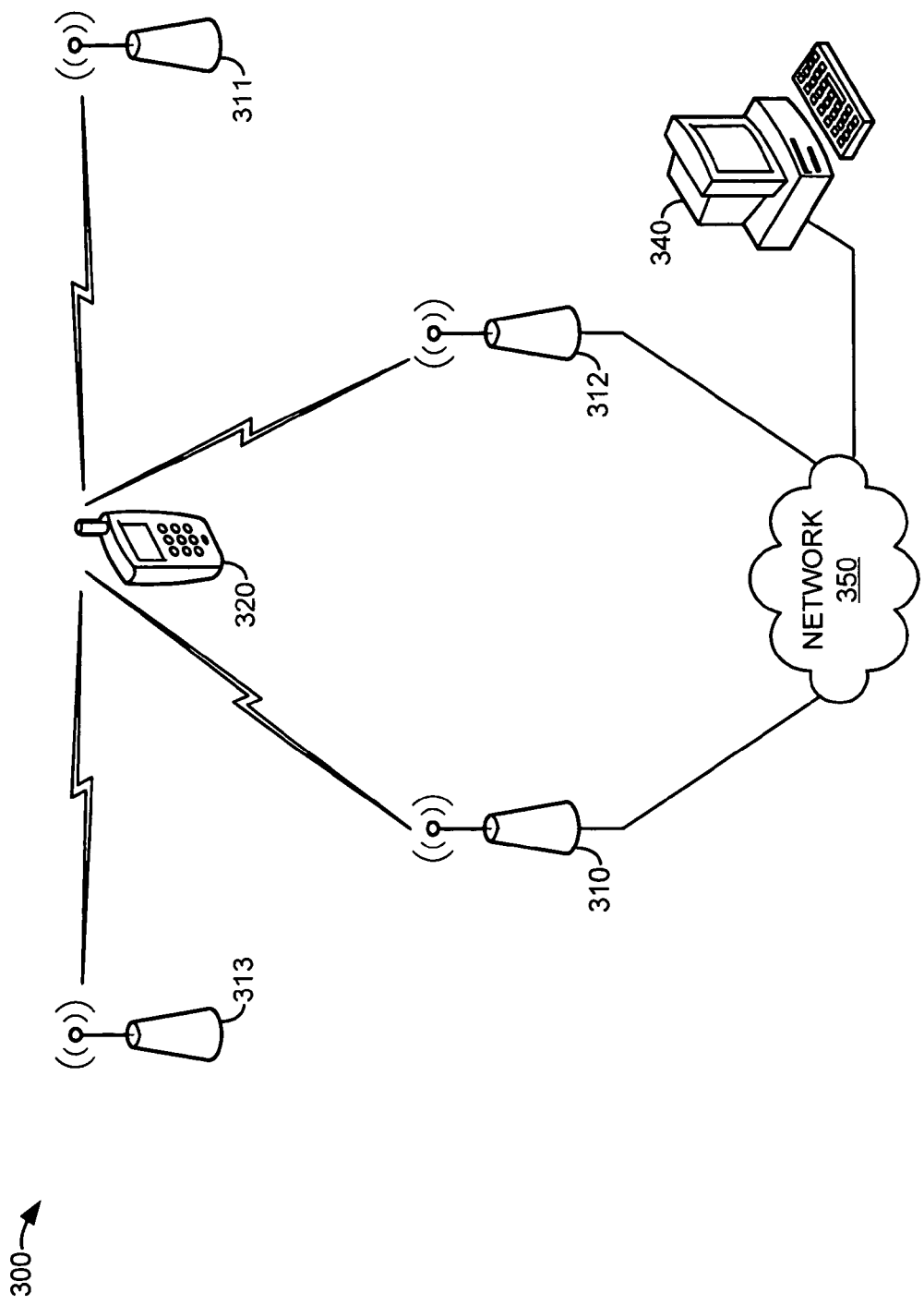
FIG. 3 is a block diagram illustrating a communication system.

FIG. 3 is a block diagram illustrating a communication system. In FIG. 3, communication system 300 comprises base station 310, base station 311, base station 312, base station 313, wireless device 320, service system 340, and network 350. In an embodiment, base stations 310-313 have overlapping service areas. Service system 340 may include a database. Base stations 310-313 are operatively coupled to network 350. Network 350 is operatively coupled to service system 340. Wireless device 320 may be operatively coupled to base stations 310-313 via wireless links.

Base station 310 and 311 may provide a first type of wireless service. For example, base stations 310 and 311 may provide a wireless service based on orthogonal frequency division multiplexing (OFDM) or orthogonal frequency division multiple access (OFDMA). In another example, base stations 310 and 311 may provide a high bandwidth wireless service based on modern standards. Examples of these high bandwidth wireless services include, but are not limited to, WiMAX and LTE. Other types of high bandwidth wireless services may be provided by base stations 310-311.

Base stations 312 and 313 may provide a second type of wireless service. For example, base stations 312 and 313 may provide wireless service that is based on code division multiple access (CDMA) or time division multiple access (TDMA). In another example, base stations 312 and 313 may provide a wireless service that is based on cellular phone technology standards. Examples of wireless services based on cellular technologies include, but are not limited to, EV-DO, Global System for Mobile communications (GSM), CDMA, and TDMA. Other types of cellular technology type wireless services may be provided by base stations 312 and 313.

Wireless device 320 may be any device, system, combination of devices, or other such communication platform capable of communicating with base stations 310-313 via wireless links. Wireless device 320 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base stations 310-313 via wireless links. Other types of communication platforms are possible.

Base stations 310 and 311 may be any wireless system that provides a first type of wireless service air interface to wireless device 320, and communication connectivity to network 350. Base stations 312 and 313 may be any wireless system that provides a second type of wireless service air interface to wireless device 320, and communication connectivity to network 350. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Network 350 may comprise a computer, a network, or a collection of computers and networks that couple, link, or otherwise operatively provide wireless device 320 with communication service. It should be understood that network 350 may comprise secondary data networks. For example, network 350 may include a backhaul network, a local network, a long distance network, a packet network, or any combination thereof, as well as other types of networks. Network 350 may be or include an access service network (ASN), an access service network gateway (ASN-GW), wireless local access network access gateway (WAG), packet data gateway (PDG), mobile switching center (MSC) and packet data serving node (PDSN).

Network 350 is operatively coupled to service system 340. Likewise, since base stations 310-313 are operatively coupled to network 350, base stations 310-313 may be operatively coupled to service system 340.

Service system 340 may be any system or collection of systems, such as a database, capable of storing and retrieving information about at least one of: (a) services provided by network 350; (b) services provided by or to networks, users, or a wireless device 320 connected to network 350; (c) configuration information for network 350; or, (d) configuration or capabilities associated with a wireless device 320. In an example, service system 340 is part of a CSN and performs authentication, authorization, and accounting operations. In another example, service system 340 is a device capabilities server (DCS) and provides information about wireless device 320. Service system 340 may manage user or device profiles for authentication (e.g., verifying device identifier, user name, or password).

Service system 340 may provide configuration information to network 350 or base stations 310-313 that specifies a type of service to deliver, and policies to enforce that may restrict access by, or services provided to, wireless device 320. For example, when wireless device 320 first couples to base station 310, wireless device 320 may send a registration message to network 350 asking for permission to use base station 310 and network 350 to communicate to other systems. The registration message may include a device identifier. Network 350 may then forward that registration message, along with a device identifier to service system 340. Service system 340 may then query a database with the device identifier to determine if wireless device 320 may use base station 310 and network 350. Service system 340 may then inform base station 310 and network 350 whether wireless device 320 may use network 350.

A device identifier may be one or more of, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 340 may also provide configuration information to base stations 310-313 and network 350 that determines how wireless device 320 may use base station 310-313 and network 350. For example, service system 340 may inform base stations 310-313 that wireless device 320 is a dual-mode wireless device.

In an embodiment, wireless device 320 may also be associated with a first profile. Other wireless devices (not shown) may be associated with other profiles. For example, wireless device 320 may be associated with a low quality of service profile. In other words, communication system 300 may associate wireless device 320 with a profile (e.g., "bronze") that is designed to differentiate wireless device 320 from other wireless devices associated with a higher quality of service profile (e.g., "silver" or "gold"). Based on this association, communication system 300 may undertake efforts to improve the quality of service provided to wireless devices associated with higher quality of service profiles at the expense of wireless devices associated with lower quality of service profiles (e.g., wireless device 320). The quality of service profile associated with wireless device 320 may be communicated by service system 340 to network 350 and base stations 310-313.

In an embodiment, some wireless devices may be associated with high-priority applications or traffic flows. For example, these wireless devices may be sending and receiving large uploads and downloads, streaming live traffic, and other minimum bandwidth dependent applications, service flows, or traffic flows. Other wireless devices, such as wireless device 320, may be using applications that are intermittent and comprise small bursts of data or low priority traffic flows. For example, wireless device 320 may be exchanging small FTP sessions, short HTTP exchanges, email, or browsing the web. The nature and quality of service to be associated with the applications, service flow, or traffic flows, associated with wireless device 320 may be communicated by service system 340 to network 350 and base stations 310-313.

In an embodiment, communication system 300 may determine the resources associated with the first type of wireless service should be reallocated. For example, network 350, or base station 310, may determine the resources associated with the first type of wireless service are heavily loaded. Communication system 300 may then take proactive steps to reduce the traffic or resource utilization associated with the first type of wireless service.

Based on a profile associated with wireless device 320, or a priority associated with an application, service flow, or traffic flow associated with wireless device 320, communication system 300 may select wireless device 320 to be moved from using the first type of wireless service to using the second type of wireless service. For example, wireless device 320 may be selected to be moved from a high-bandwidth type of wireless service to a cellular type of wireless service based on a user profile associated with wireless device 320. Wireless device 320 may be selected to be moved from a high-bandwidth type of wireless service to a cellular type of wireless service based on a quality of service profile associated with a service flow or traffic flow associated with wireless device 320. Wireless device 320 may be selected to be moved because it is associated with a lower quality of service profile or application priority than other wireless devices using the high bandwidth type of wireless service.

In an embodiment, communication system 300 moves wireless device 320 from the first type of wireless service to the second type of wireless service by sending a command and an indicator. The command causes wireless device 320 to deregister from the first type of wireless service. For example, communication system 300 may send a deregister command to wireless device 320 that causes wireless device 320 switch to an idle state.

The indicator causes wireless device 320 to refrain from reconnecting to the first type of wireless service. For example, communication system 300 may inform wireless device 320 that wireless device 320 is being placed into an idle state because of a capacity constraint associated with the first type of wireless service. Once wireless device 320 knows that there is a capacity constraint associated with the first type of wireless service, it may determine to scan for a second type of wireless service that may not be associated with a capacity constraint. Thus, wireless device 320 will, for some period of time, not attempt to scan for, or connect to, the first type of wireless service. This results in wireless device not attempting to scan for, or connect to, base stations 310 and 311—even though wireless device 320 is in base station 311's coverage area.

Wireless device 320 may then scan for, and connect to, a second type of wireless service. For example, wireless device 320 may scan for the second type of wireless service. The scanning process may result in wireless device 320 selecting wireless station 312. Wireless device 320 may select wireless station 312 based on a received signal strength. After selecting wireless station 312 to provide the second type of wireless service, wireless device 320 may connect to, and communicate with, wireless station 312.

In an embodiment, wireless device 320 may also request a service level. This service level may be associated with wireless device 320 as a whole, or a particular application, service flow, or traffic flow. For example, wireless device 320 may request a minimum throughput from wireless station 312. If wireless station 312 is able to provide the requested level of throughput, wireless station 312 may send an indication that the requested throughput is available. In another example, wireless device 320 may request, and wireless station 312 may grant, a minimum modulation and coding scheme. If wireless station 312 is not able to satisfy the requested service level, wireless device may scan for, and connect to, base station 313 if it is able to provide the requested service level.

FIG. 4 is a flow chart illustrating a method of operating a wireless device. The steps illustrated in FIG. 4 may be performed by one or more elements of communication system 100 or communication system 300.

A command and an indicator are received by a wireless device. The command causes the wireless device to deregister from a first station using a first type of wireless service. The indicator causes wireless device to avoid reregistering using the first type of wireless service (402). For example, wireless device 320 may receive a command sent via a base station 310 that cause it to deregister from the type of wireless service being provided by base station 310. Wireless device 320 may also receive an indicator sent via base station 310 the causes it to avoid reregistering with either base station 310 or base station 311.

A second type of wireless service is scanned (404). For example, wireless device 320 may scan for a second type of wireless service, such as the type being provided by base stations 312 and 313. The second type of wireless service is used for communicating (406). For example, wireless device 320 may use the type of wireless service being provided by base stations 312 and 313 to communicate with base station 312. Thus, resources associated with wireless device 320's use of the first type of wireless service may be reallocated.

Figure 5:
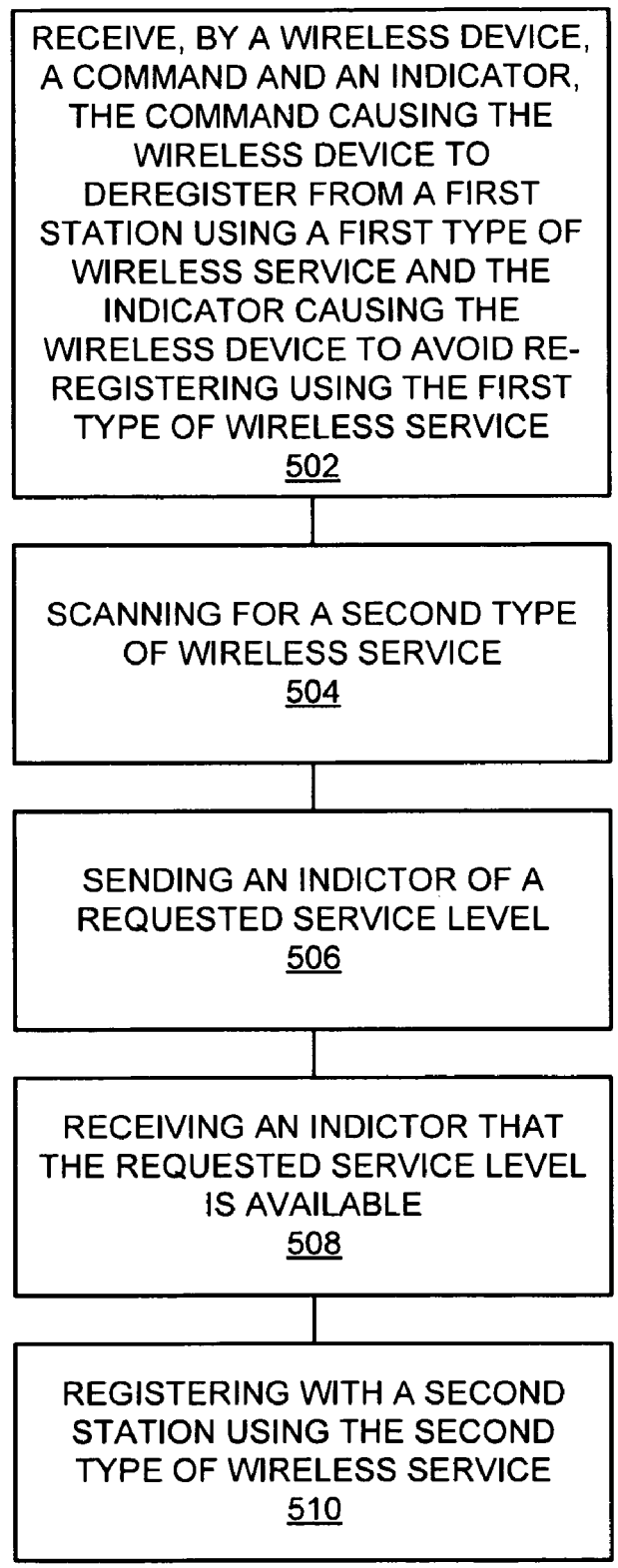
FIG. 5 is a flowchart illustrating a method of operating a wireless device.

FIG. 5 is a flow chart illustrating a method of operating a wireless device. The steps illustrated in FIG. 5 may be performed by one or more elements of communication system 100 or communication system 300.

A command and an indicator are received by a wireless device. The command causes the wireless device to deregister from a first station using a first type of wireless service and the indicator causes wireless device to avoid reregistering using the first type of wireless service (502). For example, wireless device 320 may receive a command sent via a base station 310 that cause it to deregister from the a first type of wireless service being provided by base station 310. Wireless device 320 may also receive an indicator sent via base station 310 the causes it to avoid reregistering with either base station 310 and base station 311, which are providing the first type of wireless service.

A second type of wireless service is scanned (504). For example, wireless device 320 may scan for a second type of wireless service, such as the type being provided by base stations 312 and 313. An indicator of a requested service level is sent (506). For example, wireless device 320 may send an indicator to base station 312 requesting a minimum service level. This minimum service level may be associated with a minimum throughput to be provided to wireless device 320. This minimum service level may be associated with a modulation and coding scheme to be provided to wireless device 320.

An indicator that the requested service level is available is received (508). For example, wireless device 320 may receive an indicator from base station 312. This indicator may inform wireless 320 whether the service level requested in block 506 is available from base station 320. A second station using a second type of wireless service is registered with (510). For example, wireless device 320 may register with base station 312. Wireless device 320 may register with base station 312 based on the indicator it received in block 508. In an embodiment, based on the indicator received in block 508, wireless device 320 may continue scanning for additional base stations, such as base station 313, that are providing the second type of wireless service. Wireless device 320 may register with base station 313 based on the indicator a received in block 508.

The methods, systems, devices, networks, databases, wireless stations, and base stations described above may be implemented with, contain, or be executed by one or more computer systems. The methods described above may also be stored on a computer readable medium. Many of the elements of communication network 100 and communication network 300 may be, comprise, or include computers systems. This includes, but is not limited to: communication system 100 base station 110, wireless device 120, service system 140, database 160, network 150, wireless stations 111, wireless station 112, communication system 300, base station 310, base station 311, base station 312, base station 313, wireless device 320, service system 340, and network 350.

Figure 6:
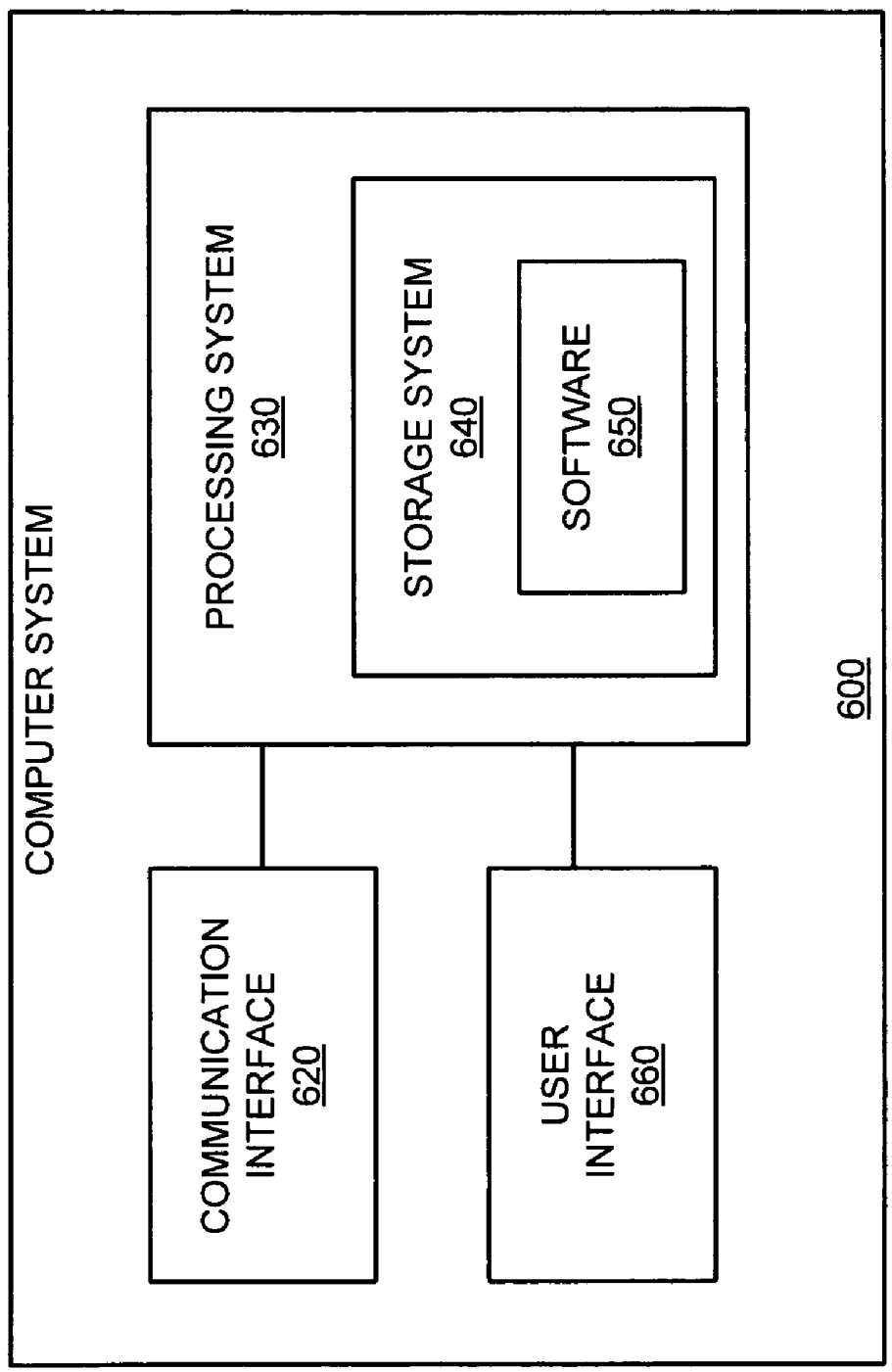
FIG. 6 illustrates a block diagram of a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    communicating, using a first station, with a wireless device via a first type of wireless service;
    determining that resources associated with the wireless device should be reallocated;
    sending a command and an indicator to the wireless device that result in the wireless device scanning for a second type of wireless service and not attempting to establish a wireless link with the first station.

2. The method of claim 1, wherein determining that resources associated with the wireless device should be reallocated is based on a profile associated with the wireless device.

3. The method of claim 2, wherein the profile is associated with a quality of service to be provided to the wireless device.

4. The method of claim 2, wherein the profile is a quality of service to be provided to a traffic flow being communicated with the wireless device.

5. The method of claim 1, wherein the command instructs the wireless device to enter an idle mode.

6. The method of claim 1, further comprising:
    communicating, using a second station, with the wireless device via the second type of wireless service.

7. The method of claim 1, wherein the first type of wireless service is a high bandwidth wireless service.

8. The method of claim 1, wherein the second type of wireless service is a cellular service.

9. A communication system, comprising:
    a first station configured to communicate with a wireless device using a first type of wireless service and, in response to a determination that resources associated with the wireless device should be re-allocated, send a command to the wireless device and an indicator that results in the wireless device scanning for a second type of wireless service and not attempting to establish a wireless link with the first station; and,
    a second station, selected by the wireless device during scanning, configured to communicate with the wireless device using the second type of wireless service.

10. The communication system of claim 9, wherein the command instructs the wireless device to enter an idle mode.

11. The communication system of claim 9, wherein determining that resources associated with the wireless device should be reallocated is based on a profile associated with the wireless device.

12. The communication system of claim 11, wherein the profile is associated with a quality of service to be provided to the wireless device.

13. The communication system of claim 11, wherein the profile is a quality of service to be provided to a service flow being communicated with the wireless device.

14. A method of operating a wireless device, comprising:
    receiving, from a first station using a first type of wireless service, a command and an indicator, the command causing the wireless device to deregister from the first type of wireless service being provided by the first station, the indicator causing the wireless device to not attempt to receive the first type of wireless service with the first station;
    scanning for a second type of wireless service; and,
    communicating using the second type of wireless service.

15. The method of claim 14, further comprising:
    registering with a second station using the second type of wireless service.

16. The method of claim 15, further comprising:
    sending an indicator of a requested service level; and,
    receiving an indication that the requested service level is available.

17. The method of claim 16, wherein the requested service level is associated with a minimum throughput.

18. The method of claim 16, wherein the requested service level is associated with a modulation and coding scheme.

* * * * *